(12) United States Patent
Mido et al.

(10) Patent No.: US 6,466,430 B2
(45) Date of Patent: Oct. 15, 2002

(54) CAPACITOR

(75) Inventors: Yuji Mido, Higashiosaka (JP);
Tetsuhiro Korechika, Sakai (JP);
Suzushi Kimura, Toyonaka (JP); Seiji Takagi, Neyagawa (JP); Koichi Kojima, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/048,011

(22) PCT Filed: May 21, 2001

(86) PCT No.: PCT/JP01/04212
§ 371 (c)(1),
(2), (4) Date: Feb. 22, 2002

(87) PCT Pub. No.: WO01/91145
PCT Pub. Date: Nov. 29, 2001

(65) Prior Publication Data
US 2002/0122287 A1 Sep. 5, 2002

(30) Foreign Application Priority Data
May 25, 2000 (JP) ......................... 2000-154202

(51) Int. Cl.[7] .............................. H01G 9/042
(52) U.S. Cl. ........................................ 361/529; 361/523
(58) Field of Search ................................. 361/523, 528, 361/529, 532, 524

(56) References Cited

FOREIGN PATENT DOCUMENTS

| EP | 1204125 | * | 5/2002 |
| JP | 9-115768 | | 5/1997 |
| JP | 2001-307955 | * | 11/2001 |

* cited by examiner

Primary Examiner—Anthony Dinkins
(74) Attorney, Agent, or Firm—Parkhurst & Wendel, LLP (57) ABSTRACT

A capacitor comprising a porous metal sheet, part of which forms an electrode section, an organic dielectrics formed on a metal surface, a solid electrolyte layer formed on the organic dielectrics, an electrode layer formed on the solid electrolyte layer, and an insulating protection layer provided for protecting said electrode section, dielectrics, solid electrolyte layer and electrode layer. The capacitor is provided with bumps, which are formed on the insulating protection layer and connected at least with the electrode section or the electrode layer. The capacitor of the present invention provides a semiconductor device or a circuit superior in the high frequency response.

7 Claims, 9 Drawing Sheets

CAPACITOR

TECHNICAL FIELD

The present invention relates to a capacitor for use in various kinds of electronic apparatus. More specifically, the present invention relates to a capacitor on which a semiconductor element can be directly mounted.

BACKGROUND ART

Electrolytic capacitors are typical of capacitors having large capacitance. An electrolytic capacitor comprises a positive electrode element formed of porous valve metal such as aluminum, tantalum, a dielectric layer covering the surface of the electrode element, a solid electrolyte layer formed of functional polymer, manganese dioxide, etc. provided thereon, and a negative electrode layer formed on the outer surface of the solid electrolyte layer. It is entirely molded with a protective material, and terminals are provided at both ends of the molded element.

The above-described conventional solid electrolytic capacitor has a shape of a chip capacitor and is mounted on the surface of a circuit board in the same manner as resistors and other inductance components.

As a result of the increasing popularity of digital circuits, electronic components used in the circuit should have a fast high frequency response. However, the above-described conventional type of solid electrolytic capacitor that is surface mounted on a circuit board, together with semiconductor elements, does not provide the circuit with a satisfactory performance of the high frequency response.

Another problem with conventional electrolytic capacitors is that they employ an oxide layer provided through an electrolytic process for the dielectrics, which layer is weak against a mechanical stress and the capacitors have the polarity. These negative factors are inconvenient in mounting the capacitors on a circuit board.

The present invention addresses the above-described problems and aims to eliminate the drawbacks. A capacitor of the present invention facilitates mounting of a semiconductor element directly on bumps provided on the surface of the capacitor to provide a superior high frequency response.

DISCLOSURE OF THE INVENTION

A capacitor of the present invention comprises a porous metal sheet, an electrode section provided on the porous metal sheet, an organic dielectric layer provided on the porous metal sheet, a solid electrolyte layer provided on the organic dielectric layer, an electrode layer provided on the solid electrolyte layer and an insulating protection layer covering the outer surface of the structure. The insulating protection layer is provided, in at least one surface of the top and the bottom, with through holes reaching the electrode section or the electrode layer. Each of the respective through holes is provided with a conductor electrically connected with either the electrode section or the electrode layer, while it is being insulated from the rest of the layers. Bumps for connection are provided on the conductor protruding above the insulating protection layer, and are to be connected with semiconductor elements or other chip components. Semiconductor elements and various kinds of chip components can be mounted on the bumps provided on the surface of a capacitor of the present invention; which enables a semiconductor device, or a circuit, that is superior in the high frequency response.

BEST MODE FOR CARRYING OUT THE INVENTION

First Embodiment

A capacitor in accordance with a first exemplary embodiment of the present invention is described below referring to the drawings.

Figure 1:
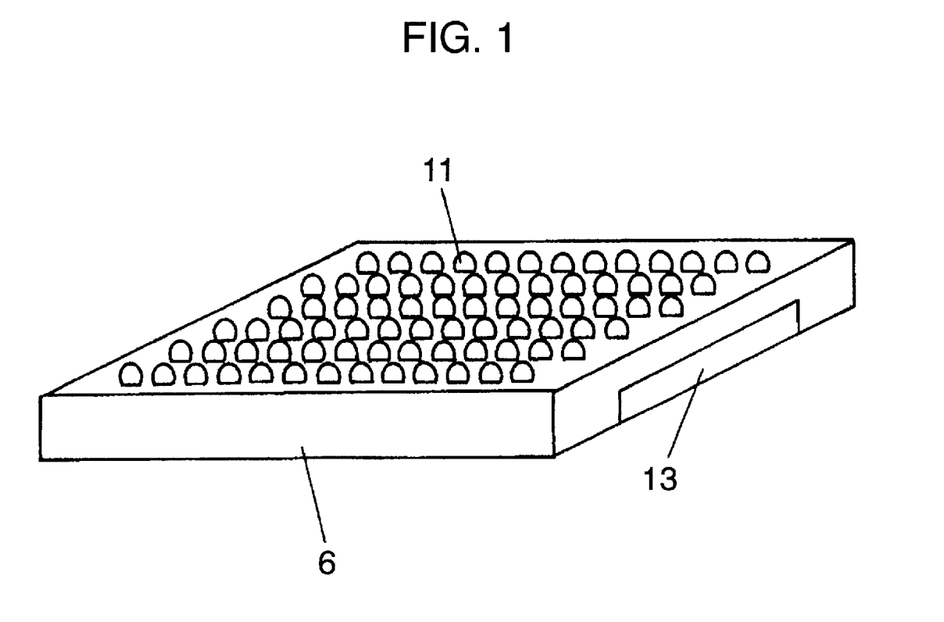
FIG. 1 A perspective view of a solid electrolytic capacitor in accordance with a first exemplary embodiment of the present invention.
Figure 2:
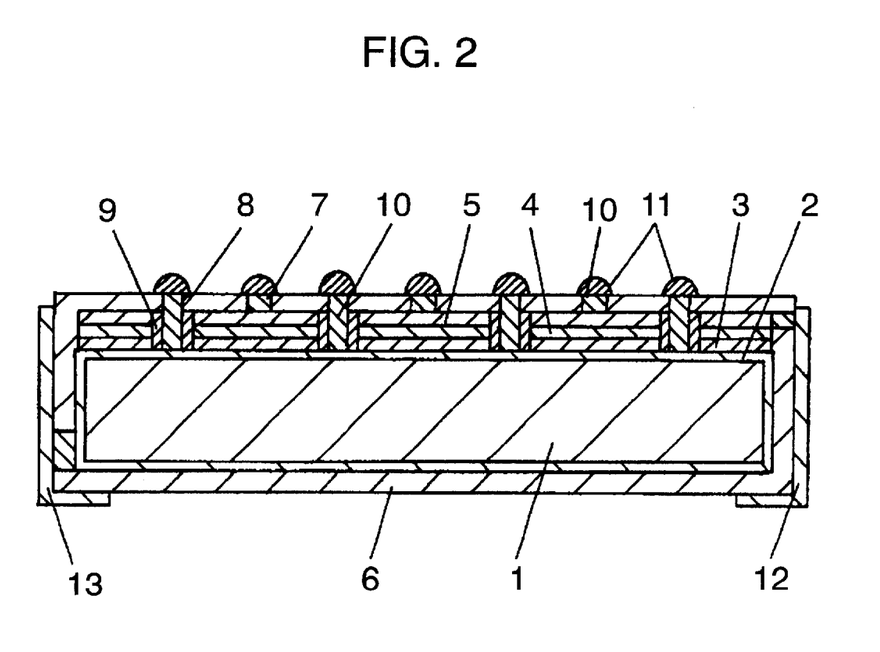
FIG. 2 A cross sectional view of the solid electrolytic capacitor.

FIG. 1 is a perspective view showing an example of a capacitor of the present invention, while FIG. 2 is a cross sectional view of the capacitor.

Referring to FIG. 1 and FIG. 2, a porous metal sheet 1 formed of a one-surface etched aluminum foil, or a sintered body of metal powder, is provided with an electrode section 2 on the surface. Besides the above-described material, any porous metal material having a large surface area may be used for the porous metal sheet.

The porous metal sheet itself may be used for the electrode section 2, or a layer of gold, copper, nickel or other metal may be formed on the porous metal sheet for the purpose. In a case where the porous metal sheet is made of a sintered body of metal powder, surface of the sintered body itself may be used for the purpose, or gold, copper, nickel, tantalum or other metal may be sputtered or vacuum deposited on the surface to form a layer.

A solid electrolyte layer 4 is provided on an organic dielectric layer 3 of such as an acrylic resin or the like formed on the surface of the porous metal sheet 1, as well as on a surface of the pores inside. The solid electrolyte layer 4 can be provided in the form of a functional polymer such as polypyrrole, polythiophene or the like, prepared by a chemical polymerlization, or an electrolytic polymerlization.

An electrode layer 5 is formed on the solid electrolyte layer 4. The electrode layer 5 may be provided by adhering a copper foil or other metal foil, or by applying a conductive paste, on the solid electrolyte layer 4.

An insulating protection layer 6 covering the entire structure may be formed by molding, coating or dipping using an epoxy resin, for example.

The insulating protection layer 6 on the electrode layer 5 is provided with a hole 7; and the insulating protection layer 6, the electrode layer 5, the dielectric layer 3 and the solid electrolyte layer 4 are provided with a hole 8. The holes 7, 8 are formed by means of laser, etching, punching or other methods.

An insulation layer 9 is formed on an inner wall of the hole 8. A conductor 10 is provided by copper-plating on an inner wall of the insulation layer 9. The conductor 10 formed in the hole 7 is electrically coupled with the electrode layer 5, while the conductor 10 in the hole 8 is electrically coupled with the electrode section 2.

On the conductor 10 exposed on the surface of the insulating protection layer 6, a bump 11 for connection is provided, the bump being formed of a solder, gold, tin, silver, etc. Number and layout pitch of the bumps 11 coincide with those of a semiconductor element to be mounted later thereon, or there are more number of bumps. The bumps 11 in excess of the counterpart bumps in the semiconductor element are for further mounting chip resistors, chip ceramic capacitors, chip inductance elements and other chip components, in addition to the semiconductor element.

Terminals 12, 13 are formed on the side and bottom surfaces of the insulating protection layer 6, coupled respectively with the electrode layer 5 and the electrode section 2.

Thus, mounting a semiconductor element directly on a surface of the capacitor eliminates wiring patterns on a circuit board and improves the high frequency response of a semiconductor device.

When a one-surface-etched aluminum foil is used for the porous sheet 1, known production facilities, technologies and know-how can be used for the production of aluminum foils for electrolytic capacitors. Namely, a sheet 1 having specific etching pits can be obtained easily by etching the aluminum foil having a mask on one surface. Thus it provides an improved productivity with the solid electrolytic capacitors, without new investments on the production facilities.

When a sintered body of metal powder is used for the porous sheet 1, surface area of the dielectrics is increased to increase static capacitance of a capacitor.

Furthermore, when one surface of the aluminum foil, or the sintered body of metal powder, is used for the electrode section 2, there is no need of forming an additional metal layer for the electrode section 2. Thus the number of constituent components is reduced, the productivity is improved, and it is an advantageous factor in cost.

If a layer of gold, copper, nickel, or other metal is provided as the positive electrode section 2 on the porous sheet 1 at the surface on which the conductor 10 is formed, a connection reliability between the conductor 10 formed in the hole 7, 8 and the electrode section 2 is improved.

If such electronic conductive polymer as polypyrrole, polythiophene or the like is used for the solid electrolyte layer 4, a capacitor having a low impedance, namely a capacitor having a faster high frequency response, is obtained.

Now in the following, an exemplary method of manufacturing a solid electrolytic capacitor of the present invention is described with referring to the drawings.

Figure 3:
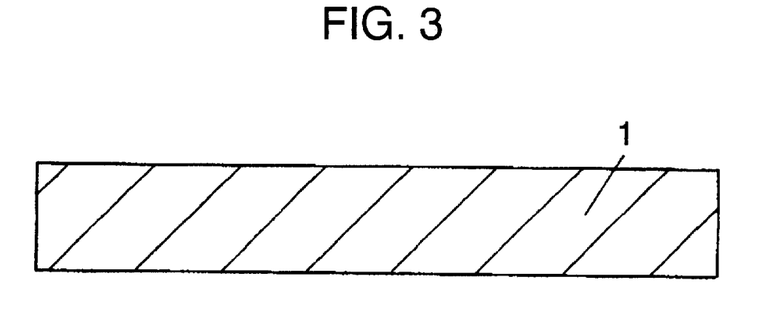
FIG. 3 A cross sectional view of a porous metal sheet.

In the first place, a one-surface etched aluminum foil, as shown in FIG. 3, is prepared for the porous sheet 1. Such aluminum foil can be readily available by etching an aluminum foil with a mask on one surface.

Figure 4:
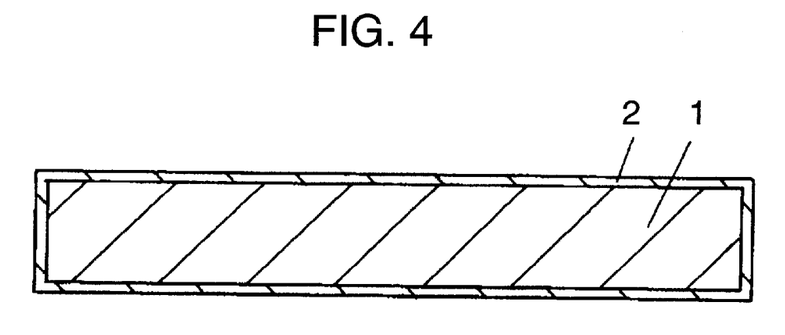
FIG. 4 A cross sectional view of the porous metal sheet with an electrode section formed thereon.

As shown in FIG. 4, the electrode section 2 of copper is formed covering the entire surface of the aluminum foil. The electrode section 2 may be provided through sputtering, vacuum deposition.

Figure 5:
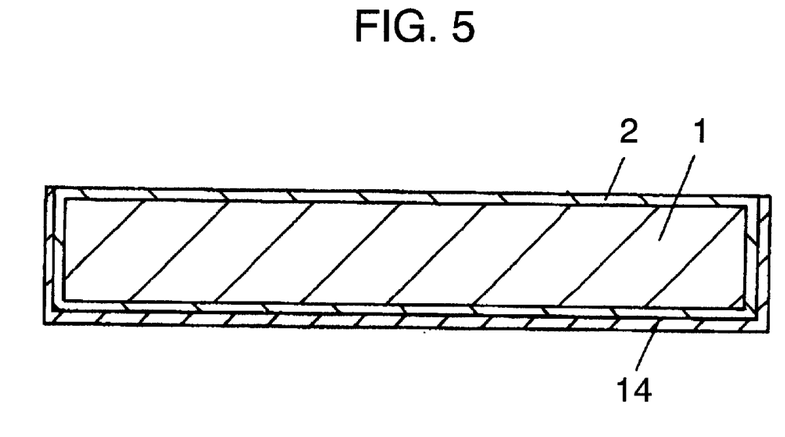
FIG. 5 A cross sectional view of the porous metal sheet with a resist layer formed thereon.

As shown in FIG. 5, a resist layer 14 of chemicals resistant photo-resist, masking tape or the like materials is provided on the porous sheet 1 on the surface excluding the etched surface.

Figure 6:
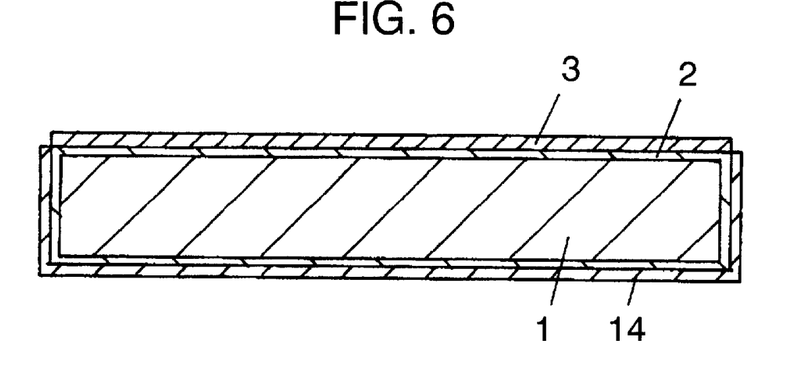
FIG. 6 A cross sectional view of the porous metal sheet with an organic dielectric layer formed on the resist layer.

Then, the aluminum foil is dipped in a solution containing an acrylic resin for electro-depositing the organic dielectric layer 3 on an area without the resist layer 14, as shown in FIG. 6.

Figure 7:
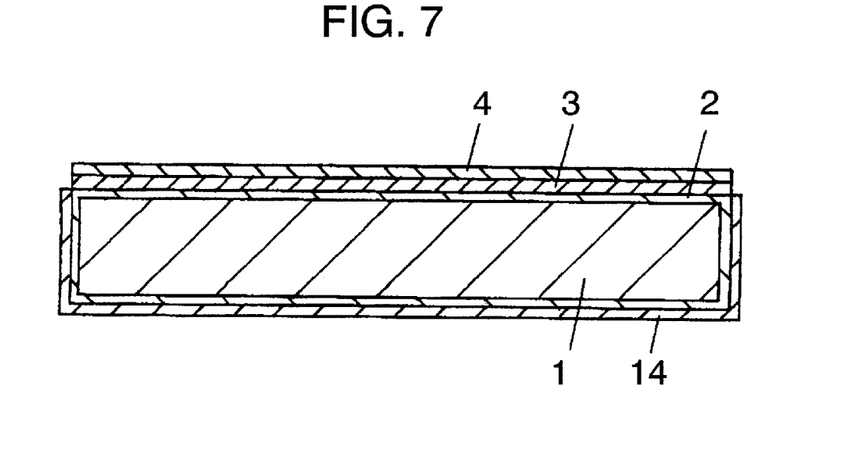
FIG. 7 A cross sectional view of a solid electrolyte layer formed on the organic dielectric layer.

The sheet with the dielectric layer 3 is dipped in a solution containing pyrrole, and then in a solution containing an oxidizer to form a thin polypyrrole layer on the dielectric layer 3 by a chemical oxidizing polymerization. The sheet with polypyrrole layer is then dipped in a solution containing pyrrole to get a thick polypyrrole layer formed on the polypyrrole layer by an electrolytic polymerization using the polypyrrole layer as the+electrode and the electrode in the solution as the−electrode. The thick polypyrrole layer is used for the solid electrolyte layer 4.

Figure 8:
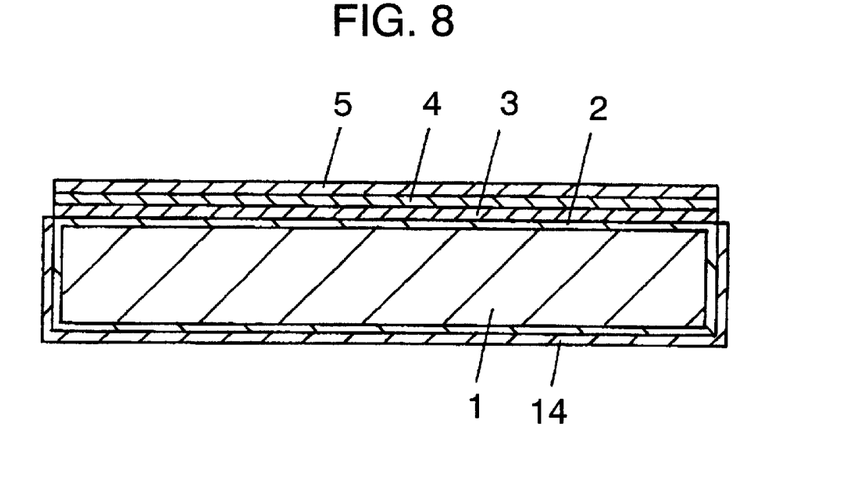
FIG. 8 A cross sectional view of an electrode layer formed on the solid electrolyte layer.
Figure 9:
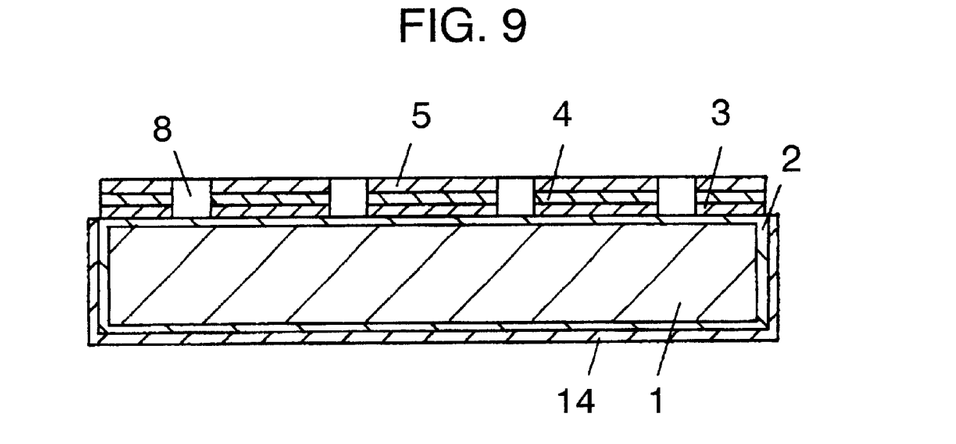
FIG. 9 A cross sectional view with holes formed.

As shown in FIG. 8, a copper electrode layer 5 is adhered on the solid electrolyte layer 4 with electrical coupling, and then as shown in FIG. 9, the electrode layer 5 is provided with holes 8 in a depth reaching the electrode section 2. A required number of the holes 8 are provided using laser beam at specified locations.

Figure 10:
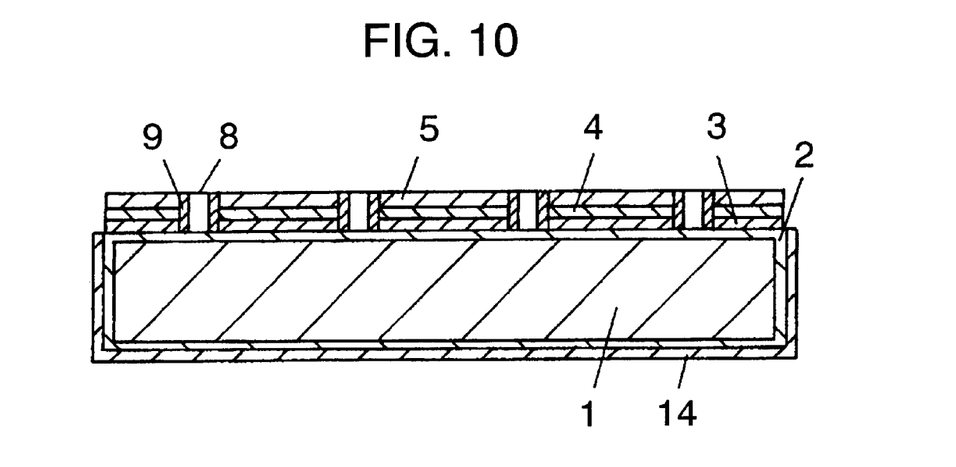
FIG. 10 A cross sectional view with an insulation layer formed in the hole.

As shown in FIG. 10, insulation layers 9 are provided by electro-depositing an insulating resin on the inner walls of the hole 8.

Figure 11:
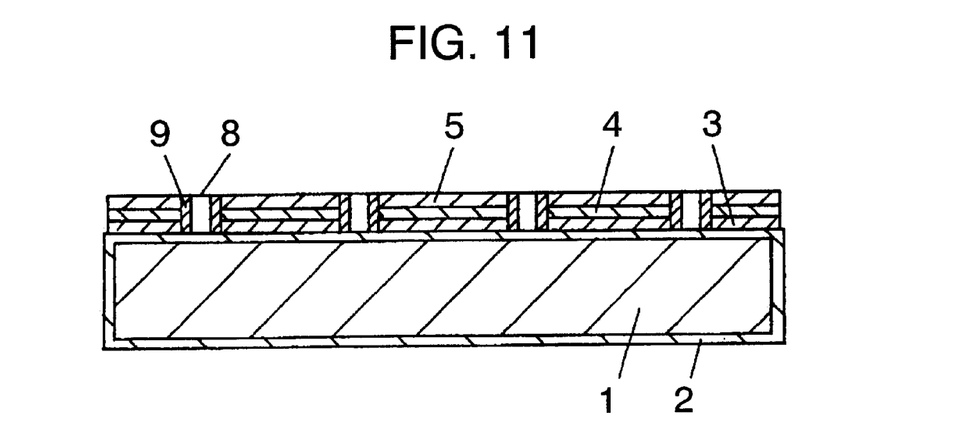
FIG. 11 A cross sectional view after the resist layer was removed.
Figure 12:
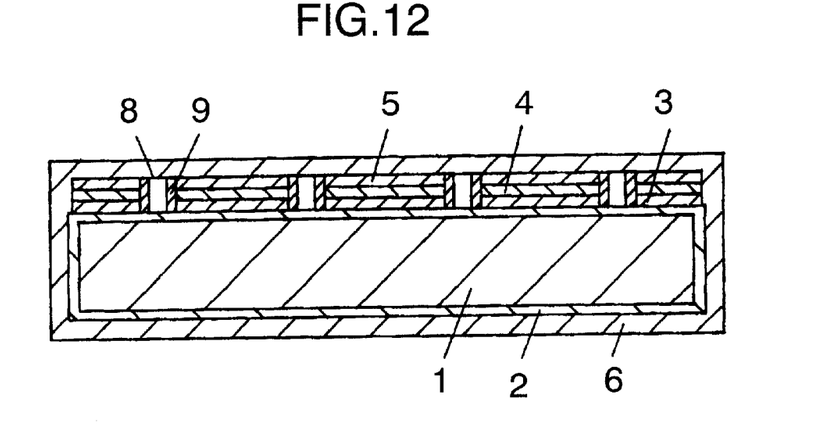
FIG. 12 A cross sectional view with an insulating protection layer formed.

After removing the resist layer 14 by peeling-off or by dissolving, as shown in FIG. 11, whole element is covered with an insulating protection layer 6 of an epoxy resin or the like material, as shown in FIG. 12.

Figure 13:
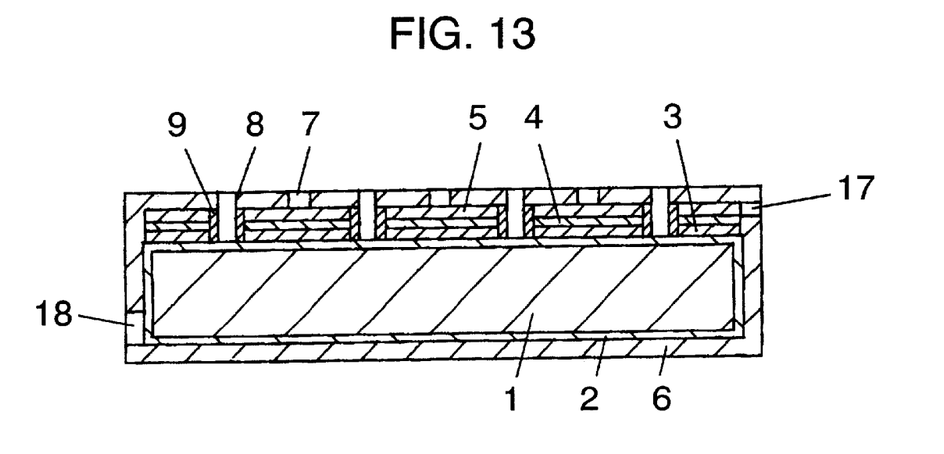
FIG. 13 A cross sectional view with holes provided in the insulating protection layer.

Then, as shown in FIG. 13, the insulating protection layer 6 is perforated by means of laser at the locations just above the holes 8 and places where the holes 7 are to be provided. The insulating protection layer 6 is further provided at a side with an opening 17 to expose the electrode layer 5, and an opening 18 at an opposite side to expose the electrode section 2.

Figure 14:
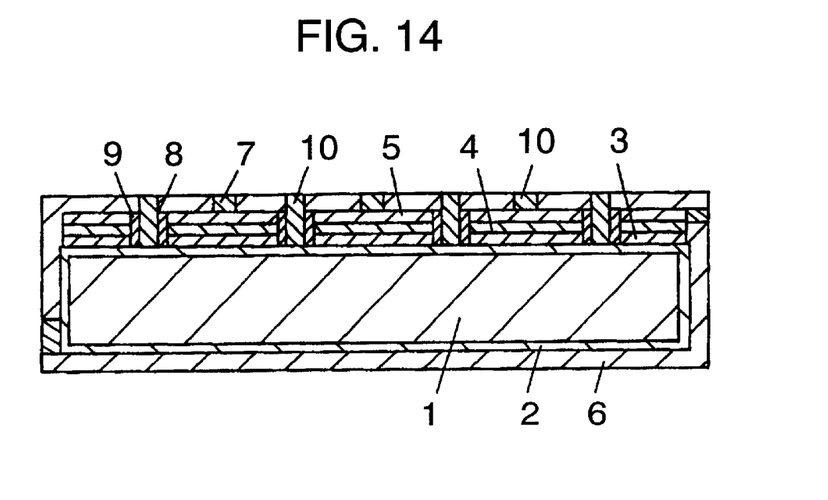
FIG. 14 A cross sectional view with a conductor formed in the hole.

As shown in FIG. 14, the inner walls of the holes 7, 8 and the openings 17, 18 are plated with copper or the like materials to form conductors 10. The conductor 10 at the hole 7 is electrically coupled with the electrode layer 5, while the conductor 10 at the hole 8 is electrically coupled with the electrode section 2.

Figure 15:
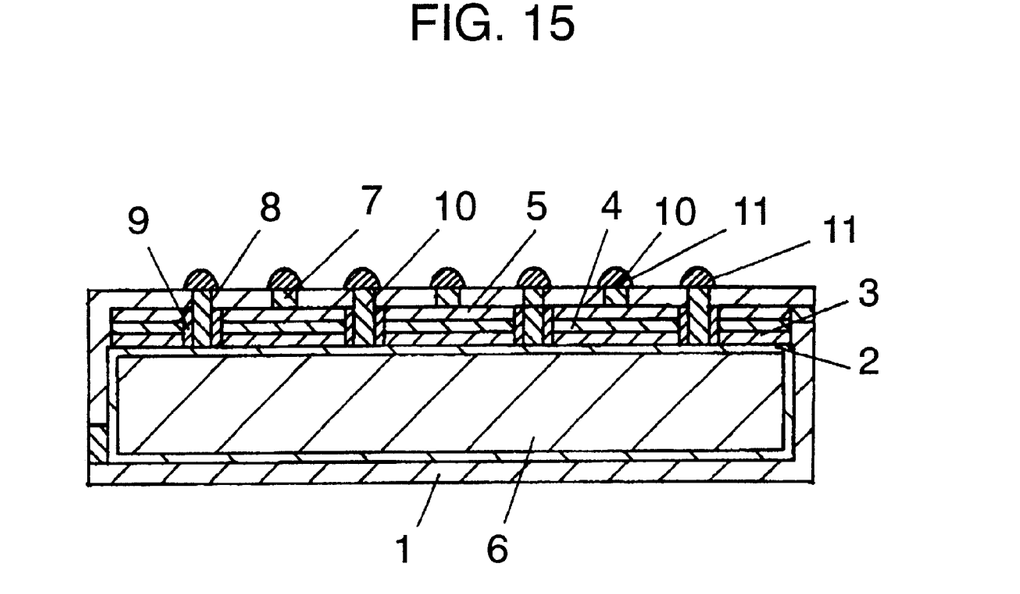
FIG. 15 A cross sectional view with bumps for connection formed on the conductors.
Figure 16:
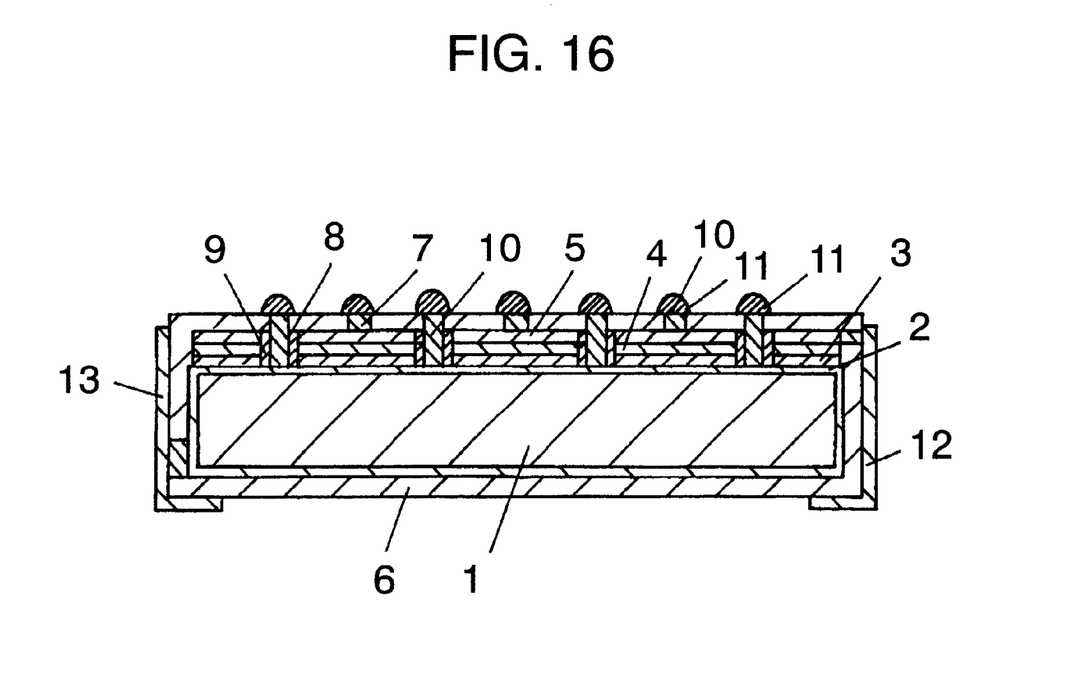
FIG. 16 A cross sectional view with terminals formed on the side face of the insulating protection layer.

Finally, as shown in FIG. 15, bumps 11 for connection made of solder, gold or silver are formed on the conductor 10 protruding above the insulating protection layer 6. At the same time, terminals 12, 13 are formed covering the side and bottom surface as shown in FIG. 16, which are coupled, respectively, with the electrode layer 5 and the electrode section 2. A finished capacitor is thus completed.

Figure 17:
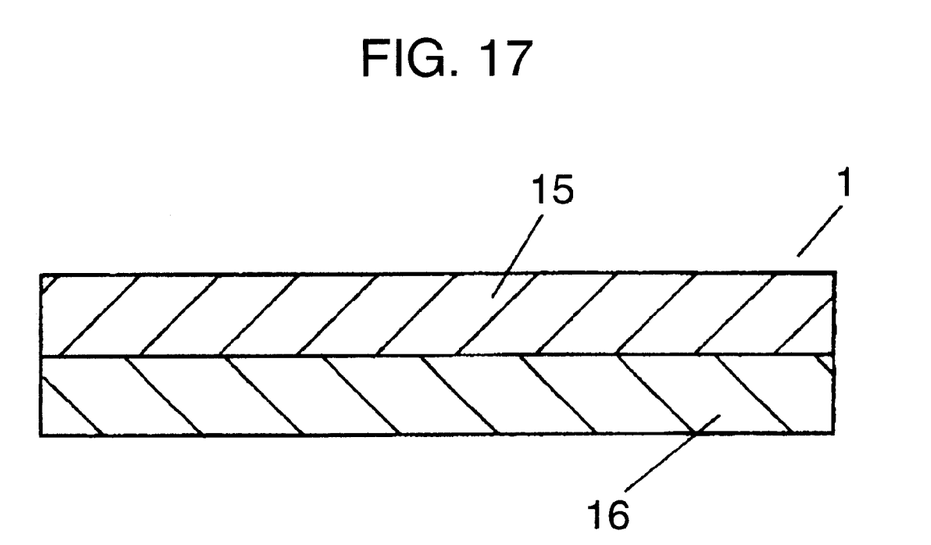
FIG. 17 A cross sectional view of other example of porous metal sheet.

In other example of the present embodiment where a sintered body of metal powder is used for the porous sheet 1, a sintered aluminum 16 is attached on one of the surfaces of an aluminum foil 15, as shown in FIG. 17, to constitute the porous sheet 1.

Other manufacturing process steps remain the same as those for the capacitors using the earlier-described one-surface etched aluminum foil.

Since a semiconductor element can be mounted directly on the capacitor, in the present embodiment, at the surface where the bumps are provided, the capacitor can be used as an appropriate device for an electronic circuit having an excellent high frequency response. Thus the capacitors of the present invention provide a substantial advantage in forming a digital circuit. Furthermore, the capacitors in the present embodiment have a thin sheet form despite their great capacitance; therefore they can be buried within a resin substrate, for example. This facilitates making circuits flat and small. Practical examples of such an application include a capacitor for a smoothing circuit and for reducing noise in thin flat cards (IC cards) or the like.

Furthermore, the dielectrics used in the capacitors in the present embodiment are organic dielectrics and there is no restriction in the location for taking the electrodes, the capacitors can have the terminals in any desired shapes. Therefore, an inductor, for example, can be provided on the capacitor, or a LC composite component can be formed with ease by putting the capacitor inside an inductor.

Moreover, the prior art electrolytic capacitor could not be used for a flexible circuit which receives an outer stress such as bending stress, because it uses a metal oxide layer as a dielectric layer. But, the dielectrics used in the capacitors of the present invention are organic dielectrics and are flexible. Thus the capacitors can be mounted on such circuits or substrates which receive a bending stress, an application where the conventional capacitors cannot endure.

Still further, the capacitors in the present embodiment can be provided with the bumps 11 on both surfaces of the sheet. Ă A capacitor of this structure is manufactured by providing the holes 7, 8 on both surfaces; the holes 7 reaching the electrode layer 5, while the holes 8 reaching the electrode section 2. An insulation layer 9 is formed in the holes 8, and a conductor 10 is formed thereon by plating. In this way, a capacitor can have bumps 11 for connection on both of the surfaces.

The terminals 12, 13 are not the essential items. The bumps 11 for connection can be used in place of the terminals 12, 13. Semiconductor elements or chip components mounted on the bumps 11 can be utilized also as the terminals.

Or, after providing the insulating protection layer 6 with openings, the electrode section 2 or the electrode layer 5 itself can be used as the terminals to be connected directly with an external circuit.

Second Embodiment

A capacitor in accordance with a second exemplary embodiment of the present invention is described in the following with reference to the drawings.

Figure 18:
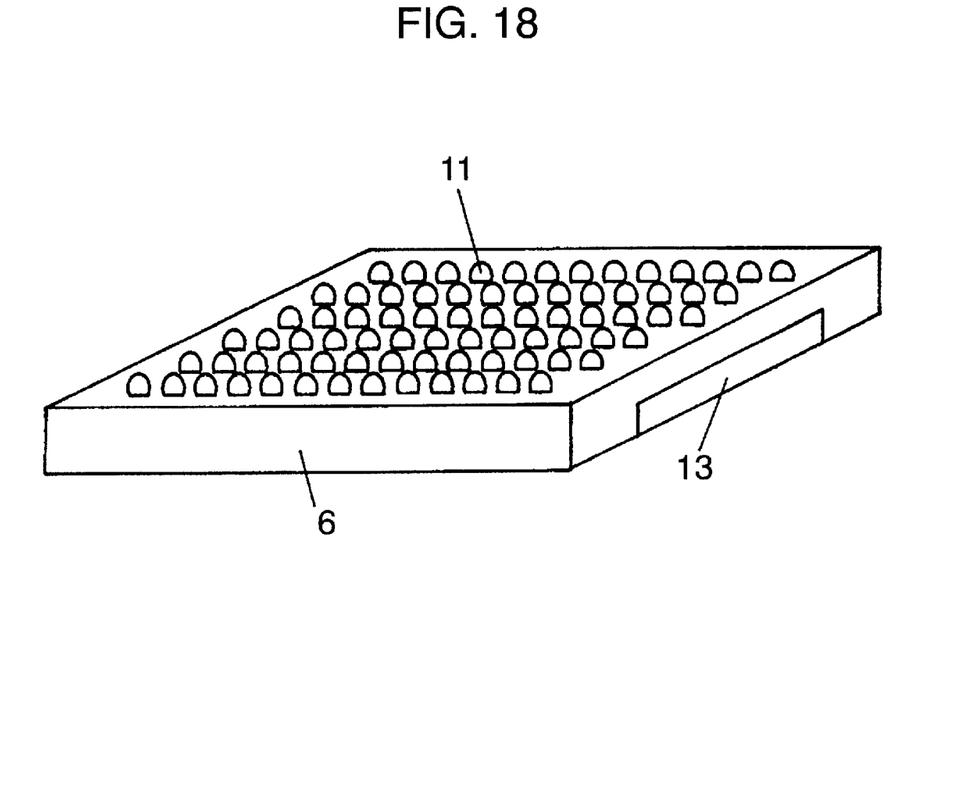
FIG. 18 A perspective view of a capacitor in accordance with a second exemplary embodiment of the present invention.
Figure 19:
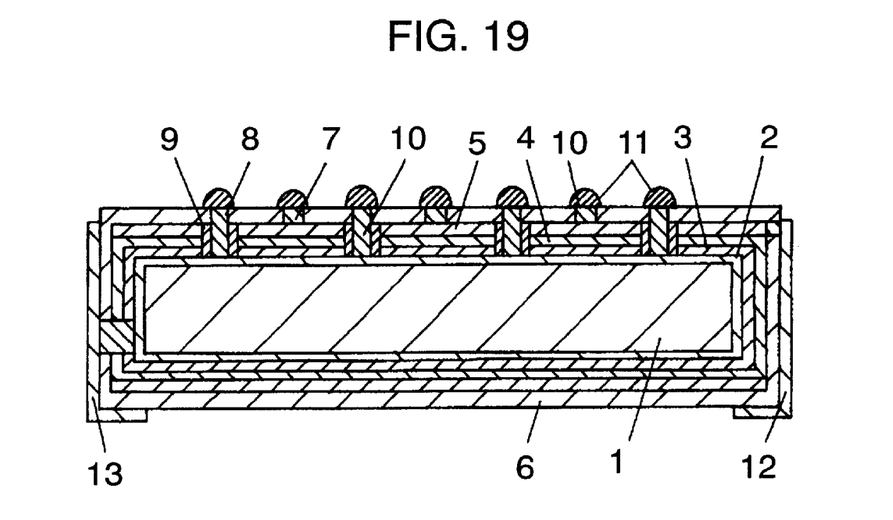
FIG. 19 A cross sectional view of the second capacitor.

FIG. 18 is a perspective view of a capacitor in accordance with a second embodiment of the present invention, while FIG. 19 shows a cross sectional view of the capacitor. Those constituent portions in FIG. 18 and FIG. 19 having the same function as in the first embodiment are represented by using the same reference numerals, and detailed description on which portions has been omitted.

Referring to FIG. 19, an electrode section 2 is provided on a surface of a porous sheet 1 formed of an aluminum foil with both surfaces etched, or a sintered body of metal powder. The porous sheet 1 itself may be used for the electrode section 2, or a layer of gold, copper, nickel or other metal may be formed for the purpose. In a case where the porous sheet 1 is made of a sintered body of metal powder, the sintered surface may be used for the electrode section 2, or gold, copper, nickel or other metal layer may formed on the surface of the porous sheet 1 by means of sputtering, vacuum deposition, or the like method.

An organic dielectric layer 3 of an acrylic resin or the like is formed on an entire surface, as well as on surface of the pores inside, of the porous sheet 1. A solid electrolyte layer 4 is formed on the organic dielectric layer 3, and an electrode layer 5 on the solid electrolyte layer 4. Then the entire structure is covered by an insulating protection layer 6.

The insulating protection layer 6 on the electrode layer 5 is provided with a hole 7; and the insulating protection layer 6, the electrode layer 5, the solid electrolyte layer 4 and the organic dielectric layer 3 are provided with a hole 8 reaching the electrode section 2.

Inner walls of the hole 8 are provided with insulation layers 9. Conductors 10 are formed by copper-plating the wall surface of the insulation layers 9. The conductors 10 formed in the holes 7 are electrically coupled with the electrode layer 5, while the conductors 10 in the holes 8 are electrically coupled with the electrode section 2.

On the conductors 10 exposed on the surface of the insulating protection layer 6, bumps 11 of a solder, gold, tin, silver or the like for connection are formed. Terminals 12, 13 are provided on the side and bottom surface of the insulating protection layer 6, coupled with the electrode layer 5 and the electrode section 2, respectively.

The capacitors in accordance with the present embodiment are provided with a dielectric layer covering the entire surface of a both-surface etched aluminum foil. Thus, the electrode facing area have been extended to a substantially increased capacitance of the capacitor.

Third Embodiment

A capacitor in accordance with a third exemplary embodiment of the present invention is described in the following with reference to the drawings.

Figure 20:
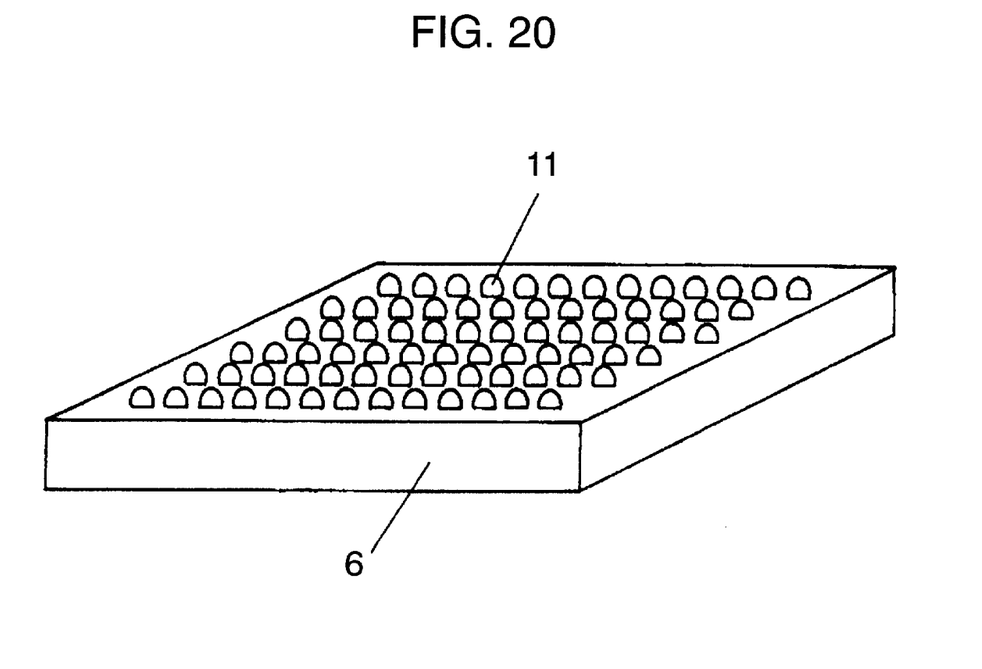
FIG. 20 A perspective view of a capacitor in accordance with a third exemplary embodiment of the present invention.
Figure 21:
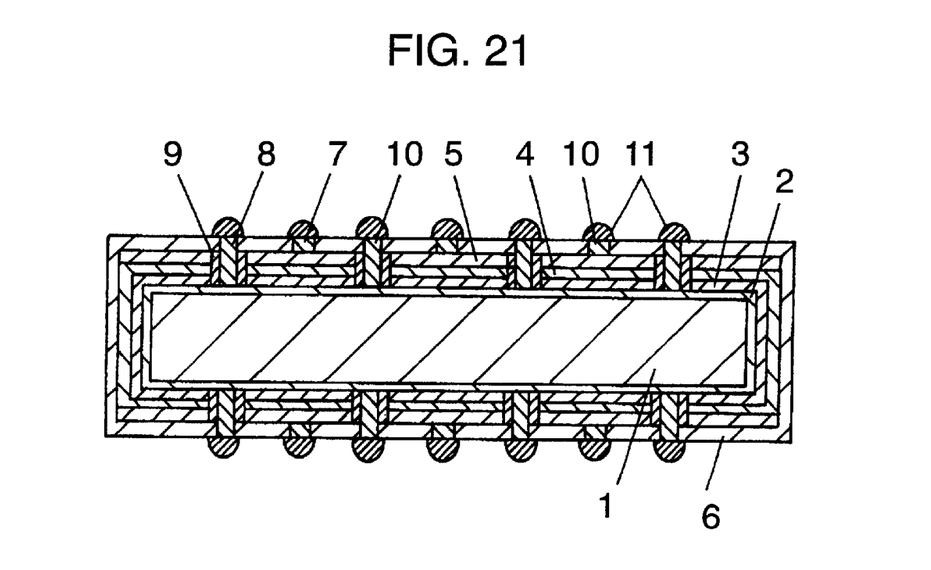
FIG. 21 A cross sectional view of the third capacitor.

FIG. 20 is a perspective view of a capacitor in accordance with a third embodiment of the present invention, while FIG. 21 shows a cross sectional view of the capacitor. Those constituent portions in FIG. 20 and FIG. 21 having the same function as in the first embodiment are represented by using the same reference numerals, and detailed descriptions on the portions are omitted.

Referring to FIG. 21, an electrode section 2 is provided on a surface of a porous sheet 1 formed of a both-surface etched aluminum foil, or a sintered body of metal powder. The porous metal sheet 1 itself may be used for the electrode section 2, or a layer of gold, copper, nickel or other metal may be formed for the purpose. In a case where the porous sheet 1 is made of a sintered body of metal powder, the sintered surface may be used for the electrode section 2, or a layer of gold, copper, nickel or other metal may be formed by sputtering, vacuum deposition or the like method.

A solid electrolyte layer 4 is formed on an organic dielectric layer 3 of an acrylic resin provided on a entire surface of said porous sheet 1, as well as on surfaces of the pores inside. An electrode layer 5 is formed on the solid electrolyte layer 4, and the entire structure is covered with an insulating protection layer 6.

The insulating protection layer 6 is provided with holes 7, 8 on both of the top and the bottom surfaces; the hole 8 penetrates through the insulating protection layer 6, the electrode layer 5, the solid electrolyte layer 4 and the organic dielectric layer 3, reaching the electrode section 2. These holes are formed by means of laser, etching, punching or other methods.

Inner wall of the holes 8 are covered with insulation layers 9. And conductors 10 are formed by copper-plating or the like method on the wall surface of the insulation layer 9. The conductors 10 formed in the holes 7 are electrically coupled with the electrode layer 5, while the conductors 10 in the holes 8 are electrically coupled with the electrode section 2.

On the conductors 10 exposed on the surface of the insulating protection layer 6, bumps 11 of a solder, gold, tin, silver or the like materials for connection are formed.

Thus the bumps 11 provided on both surfaces of a capacitor body facilitate direct mounting of semiconductor elements or the like on the capacitor surfaces; which eliminates wiring patterns on the circuit board needed for the interconnection and improves the high frequency response of the circuit remarkably. Furthermore, the capacitor in the present embodiment enables formation of circuits in various arrangements; for example, mounting semiconductor elements on the upper surface, while using the bottom surface for mounting chip components or for interconnections. Thus the capacitor in the present embodiment may serve as an effective tool in designing circuits of superior performance.

Like in the second embodiment, the dielectric layer covering the entire surface of a both-surface etched aluminum foil provides a remarkably increased capacitance. Furthermore, a plurality of the capacitors of the present embodiment can be laminated, which makes it possible to increase the capacitance and to increase the withstanding voltage.

Besides the above-described exemplary embodiments, for example, a capacitor of the present invention may be embodied in various other forms in the arrangements of bumps 11 for connection and terminals 12, 13. Thus the capacitors of the present invention can comply with various needs of connection in the formation of circuits and in the mounting procedure.

INDUSTRIAL APPLICABILITY

With the solid electrolytic capacitors in accordance with the present invention having the above-described structure, a semiconductor element can be mounted directly on the bumps provided on the surface of the capacitor to form a semiconductor device. Thus, the capacitors of the present invention facilitate formation of an electronic circuit and a semiconductor device that are superior in the high frequency response, and thus are effective for use in digital circuits. The capacitors of the present invention are most suitable for an application in digital circuits, where a high speed response is an essential requirement.

Furthermore, dielectrics of the capacitors of the present invention are formed of an organic material, and are flexible.

So, the capacitors can be mounted on such a circuit board or a substrate which suffers a bending force, an application where conventional capacitors are unable to endure. Despite a thin configuration, the capacitors of the present invention can withstand a mechanical stress, and can be buried within a substrate. This contributes to further downsizing of the electronic appliences.

Still further, since there is no restriction for the location of leading out the electrodes, terminals can be formed in any arrangements, which makes it easy to design a composite component with the capacitor of the present invention.

What is claimed is:

1. A capacitor comprising:

a porous metal sheet;

an electrode section provided on said porous metal sheet;

an organic dielectric layer provided on said porous metal sheet;

a solid electrolyte layer provided on said organic dielectric layer;

an electrode layer provided on said solid electrolyte layer;

an insulating protection layer covering said porous metal sheet, said electrode section, said organic dielectric layer, said solid electrolyte layer and said electrode layer;

a conductor provided in holes penetrating through said insulating protection layer and reaching said electrode section or said electrode layer, each of the respective conductor being electrically connected with either said electrode section or said electrode layer, while being insulated from the other layers; and a bump provided on said conductor protruding above said insulating protection layer.

2. The capacitor of claim 1, wherein said porous metal sheet is an aluminum foil with at least one of surfaces etched.

3. The capacitor of claim 1, wherein said porous metal sheet is a sintered body of metal powder.

4. The capacitor of claim 1, wherein said electrode section is a layer of a different metal formed on a surface of an aluminum foil.

5. The capacitor of claim 1, wherein said electrode section is a layer of a different metal formed on a surface of sintered body of metal powder.

6. The capacitor of claim 1, wherein said solid electrolyte layer is formed of an electronic conductive polymer.

7. The capacitor of claim 1, wherein a number of said bumps is larger than a number of bumps of a semiconductor element to be connected.

* * * * *